United States Patent
Miyazaki (10) Patent No.: US 9,426,315 B2
(45) Date of Patent: Aug. 23, 2016

(54) FUNCTION EXECUTION DEVICE (71) Applicant: BROTHER KOGYO KABUSHIKI KAISHA, Nagoya-shi, Aichi-ken (JP)

(72) Inventor: Sadaaki Miyazaki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/028,168

(22) Filed: Sep. 16, 2013

(65) Prior Publication Data
US 2014/0085654 A1 Mar. 27, 2014

(30) Foreign Application Priority Data

Sep. 27, 2012 (JP) ................................. 2012-214802

(51) Int. Cl.
*G06K 15/00* (2006.01)
*H04N 1/00* (2006.01)

(52) U.S. Cl.
CPC ....... *H04N 1/00477* (2013.01); *H04N 1/00209* (2013.01); *H04N 1/00307* (2013.01); *H04N 2201/001* (2013.01); *H04N 2201/006* (2013.01); *H04N 2201/0055* (2013.01); *H04N 2201/0075* (2013.01); *H04N 2201/0094* (2013.01)

(58) Field of Classification Search
CPC .......... H04N 1/00209; H04N 1/00307; H04N 1/00477; H04N 2201/001; H04N 2201/0055; H04N 2201/006; H04N 2201/0075; H04N 2201/0094
See application file for complete search history.

(56) References Cited

U.S. PATENT DOCUMENTS

| 9,128,644 | B2 | 9/2015 | Kamei et al. |
| 2006/0093346 | A1* | 5/2006 | Ishiyama ............... G03B 17/14 396/287 |
| 2007/0206225 | A1* | 9/2007 | Shinohara et al. ........... 358/1.16 |
| 2007/0256020 | A1* | 11/2007 | Haga .................... H04N 1/4406 715/741 |
| 2008/0074713 | A1 | 3/2008 | Nakawaki |
| 2008/0186536 | A1 | 8/2008 | Shimizu |

(Continued)

FOREIGN PATENT DOCUMENTS

| CN | 102147699 A | 8/2011 |
| CN | 102547017 A | 7/2012 |

(Continued)

OTHER PUBLICATIONS
Chinese Office Action issued in related Chinese application No. 201310450333.X, Sep. 14, 2015.
(Continued)

*Primary Examiner* — Tammy Pham
*Assistant Examiner* — Bharatkumar Shah
(74) *Attorney, Agent, or Firm* — Merchant & Gould P.C.

(57) ABSTRACT

A function execution device, which is capable of executing one or more functions, which has a communication device configured to communicate with an information processing device, a displaying device configured to display a screen corresponding to one of the functions, a storing device configured to store identifying information which identifies a screen to be displayed on the displaying device for each of the functions, and a controller. The controller executes instructions to provide a transmitting unit configured to transmit the identifying information identifying the screen being displayed on the displaying device and an invoking command to invoke an application corresponding to the identifying information to the information processing device through the communication device.

21 Claims, 6 Drawing Sheets

(56) References Cited

U.S. PATENT DOCUMENTS

| | | | |
|---|---|---|---|
| 2009/0144629 A1* | 6/2009 | Ferlitsch | H04L 67/04 715/736 |
| 2011/0119601 A1* | 5/2011 | Knothe | G06F 8/38 715/760 |
| 2011/0231922 A1 | 9/2011 | Azuma | |
| 2012/0092714 A1* | 4/2012 | Suzuki | G06F 3/1212 358/1.15 |
| 2012/0092715 A1* | 4/2012 | Kamei et al. | 358/1.15 |
| 2012/0113468 A1 | 5/2012 | Urakawa | |
| 2012/0212763 A1* | 8/2012 | Honma | G06F 3/1204 358/1.13 |
| 2013/0258381 A1 | 10/2013 | Sato | |
| 2013/0258382 A1 | 10/2013 | Sato | |

FOREIGN PATENT DOCUMENTS

| | | |
|---|---|---|
| CN | 102547019 A | 7/2012 |
| JP | 2007-150958 A | 6/2007 |
| JP | 2008-079151 A | 4/2008 |
| JP | 2008-193265 A | 8/2008 |
| JP | 2011-087249 A | 4/2011 |
| JP | 2011-193390 A | 9/2011 |
| JP | 2012-093877 A | 5/2012 |

OTHER PUBLICATIONS

Notification of Reasons for Rejection issued in related Japanese application No. 2012-214802, mailed Feb. 16, 2016.

* cited by examiner

FUNCTION EXECUTION DEVICE

CROSS-REFERENCE TO RELATED APPLICATION

This application claims priority under 35 U.S.C. §119 from Japanese Patent Application No. 2012-214802 filed on Sep. 27, 2012. The entire subject matter of the application is incorporated herein by reference.

BACKGROUND

1. Technical Field

The present invention relates to a function execution device.

2. Prior Art

Conventionally, there has been known a scanning device which is configured to read original type information from an RFID (Radio Frequency Identification Device) embedded in an original and invokes an application corresponding to the original type information when a scanning operation is executed.

In order to operate a function execution device capable of executing one or more functions under control of an application running in an information processing device such as a smartphone, an appropriate application should be invoked in accordance with a current status of the function execution device. Such a configuration is relatively bothersome. The technique disclosed in the above-described prior art requires one RFID (radio-frequency identification) is embedded in the original in order to have one desired application invoked. Therefore, even if such a technique is employed in a system having the function execution device and information processing device, it is difficult to deal with change of the status of the function execution device.

SUMMARY

In view of the above, it is an object of the present invention to provide a function execution device configured to cause an appropriate application to be invoked in an information processing device based on the status of the function execution device.

According to the aspects of the invention, there is provided a function execution device capable of executing one or more functions, which has a communication device configured to communicate with an information processing device, a displaying device configured to display a screen corresponding to one of the functions, a storing device configured to store identifying information which identifies a screen to be displayed on the displaying device for each of the functions, and a controller. The controller executes instructions to provide a transmitting unit configured to transmit the identifying information identifying the screen being displayed on the displaying device and a command to invoke an application corresponding to the identifying information to the information processing device through the communication device.

It should be noted that aspects of the present invention can be configured in various manners, which include a controlling device for controlling a function execution device, a function controlling system, a method of executing functions and the like.

DESCRIPTION OF THE EMBODIMENT

Figures 1A, 1B, 1C:
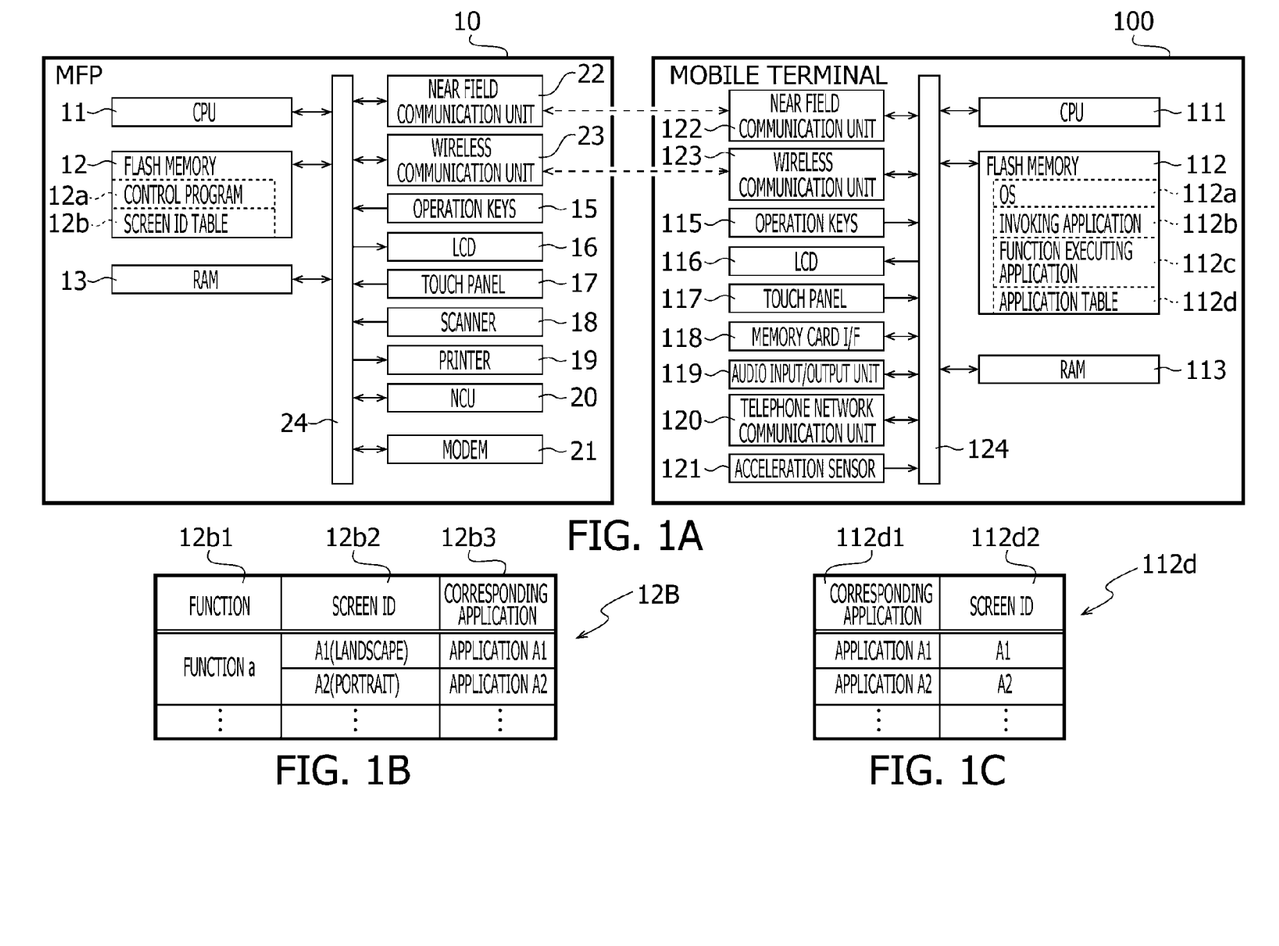
FIG. 1A is a block diagram showing an electric configuration of an MFP (multi-function peripheral) and a smartphone according to an embodiment of the invention.
FIG. 1B schematically shows contents of screen ID table according to the embodiment of the invention.
FIG. 1C schematically shows contents of application table according to the embodiment of the invention.

Hereinafter, a preferable embodiment according to the invention will be described, referring to the accompanying drawings. FIG. 1A is a block diagram showing an electrical configuration of a multi-function peripheral (MFP) 10 and FIG. 1B is a block diagram showing an electrical configuration of a mobile terminal 100, which is capable of communicating with the MFP 10. The MFP 10 has, as main functions, a scanner function, a printer function and a facsimile function. Further, the MFP 10 also has a text input function, an audio input function, a shortcut registration function, a preview displaying function and the like. According to the embodiment, the MFP 10 is capable of transmitting a screen ID and an application invoke command corresponding to an image displayed on an LCD (liquid crystal display) 16 to the mobile terminal 100. Thus, by operating the mobile terminal 100, a user is capable of easily and conveniently controlling a currently-executed function of the MFP 10.

The MFP 10 typically has a CPU (central processing unit) 11, a flash memory 12, a RAM (random access memory) 13, operation keys 15, an LCD (liquid crystal display) 16, a touch panel 17, a scanner 18, a printer 19, an NCU (network control unit) 20, a MODEM (modulator/demodulator) 21, a near field communication unit 22, and a wireless communication unit 23. The units 11-13 and 15-23 are interconnected through input/output port 24. The CPU 11 controls functions the MFP 10 has and the units connected to the input/output port 24 in accordance with parameters and programs stored in the flash memory 12, data stored in the RAM 13 and signals received/transmitted through the NCU 20.

Figure 3A:
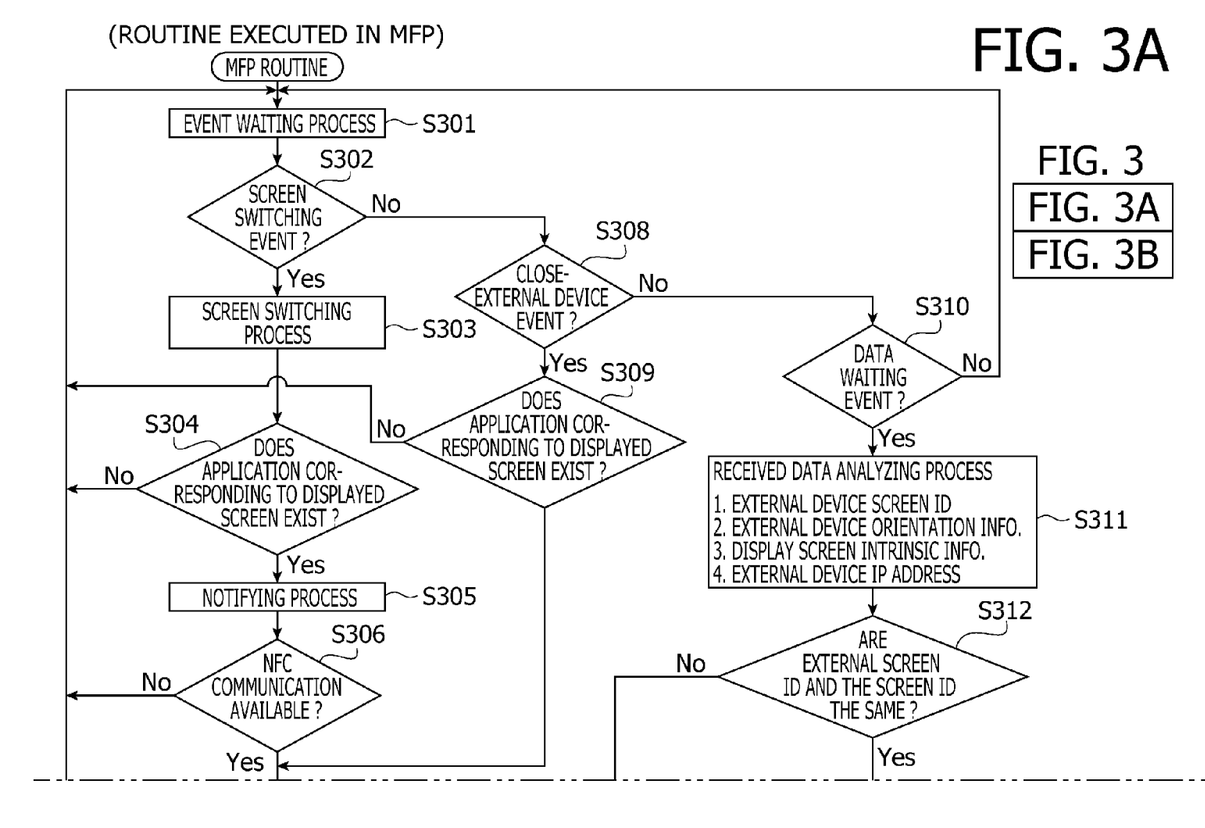
FIGS. 3A and 3B show a flowchart illustrating an MFP side process according to the embodiment of the invention.
Figure 3B:
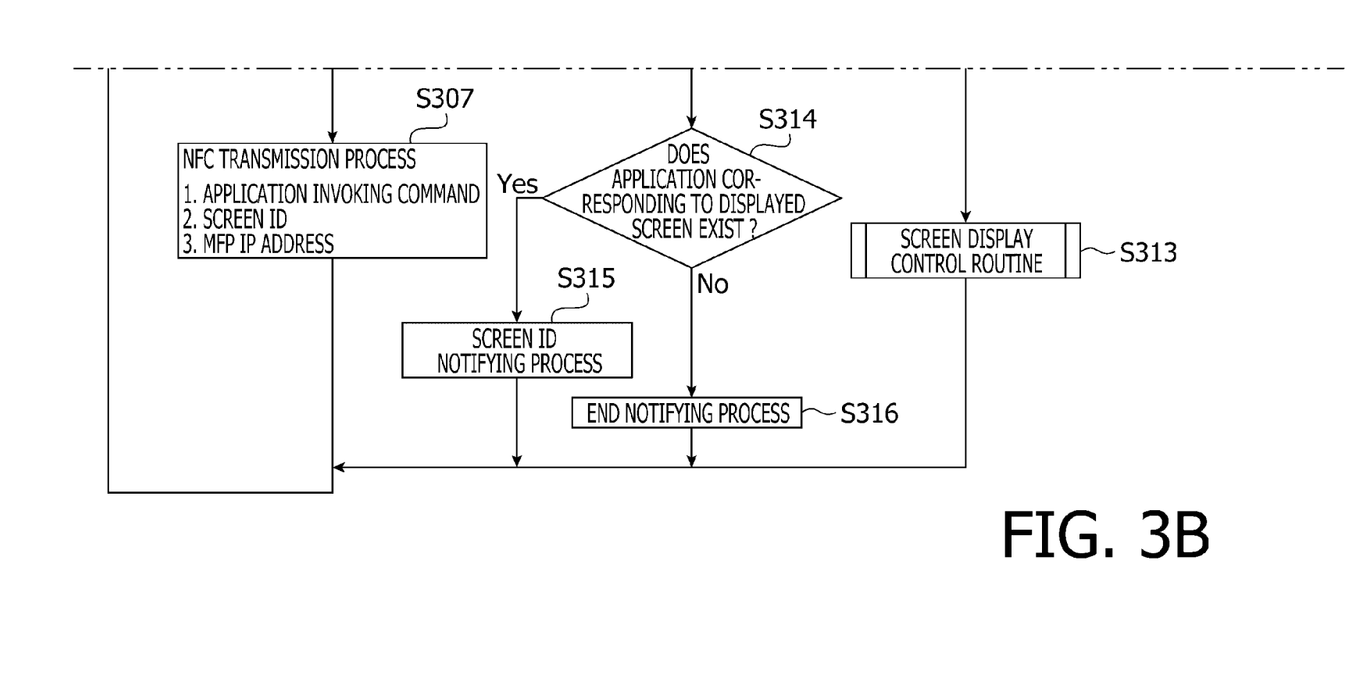
Figure 4:
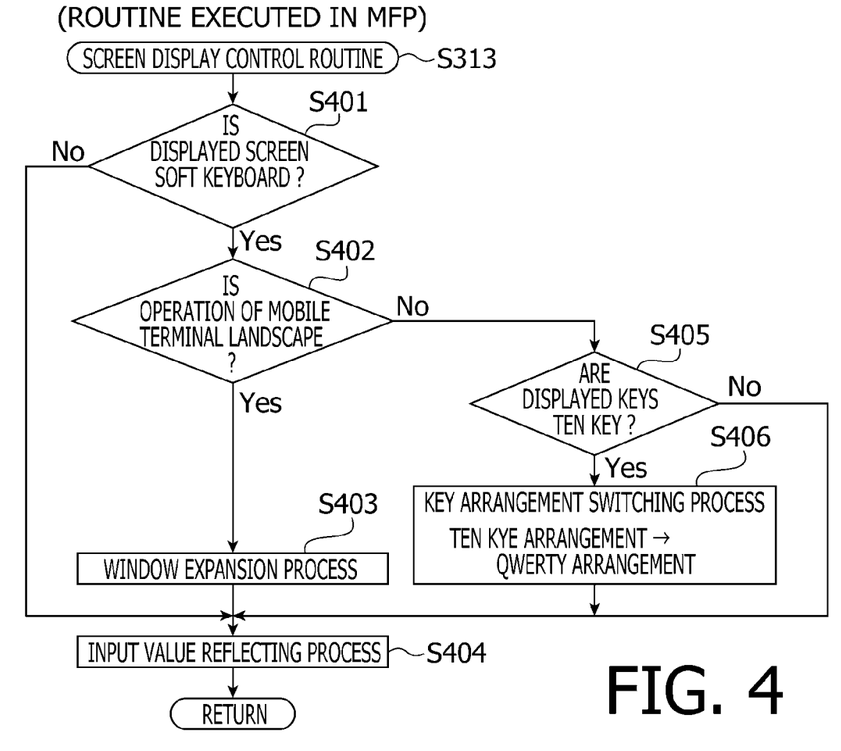
FIG. 4 is a flowchart illustration a display control process according to the embodiment of the invention.

The flash memory 12 is a non-volatile memory and stores control programs 12a for controlling operations of the MFP 10. The processes shown in flowcharts of FIGS. 3 and 4 are executed by the CPU 11 based on the control program 12a. The flash memory 12 also stores screen ID table 12b. The screen ID table 12b is a table indicating a relationship between screen IDs identifying screens displayed when each function is executed in the MFP 10 and applications which can be installed in the mobile terminal 100 as function execution applications 112c.

As the screen ID table 12b, one provided by a manufacturer of the MFP 10 is stored in the flash memory 12 as default data. The screen ID table 12b is occasionally updated based on update information which is provided by the manufacturer. The RAM 13 is a rewritable volatile memory having a temporary area for temporarily storing data when the CPU 11 executes control programs 12a.

The operation keys 15 are mechanical keys provided on a casing of the MFP 10, and the user can input various setting values, commands and the like through the operation keys 15. The LCD 16 is used for displaying various screens. On the LCD 16, the touch panel 17 is provided in an overlapped manner. The touch panel 17 detects a designated position when a designating member such as a finger or a stylus pen touches or approaches, and inputs the detected position (i.e., the designated position) in the MFP 10. The scanner 18 scans an original and converts an optical image into image data. The printer 19 prints out an image on a printing sheet based on the image data. The MODEM 21 converts image data to be transmitted to a modulated signal which can be transmitted through a telephone network, and transmits the signal to a destination device through the NCU 20 when the facsimile transmission is executed. When such a signal is received from outside, through the NCU 20, the MODEM 21 demodulates the received signal to generate image data. The NCU 20 interfaces the telephone network and the MFP 10, and controls the connection between the telephone network and the MFP 10 by closing/opening the telephone line in accordance with a command transmitted from the MODEM 21

The near field communication unit 22 is an interface enabling a near field communication in which a communication within a very short distance (e.g., approximately within ten centimeters). According to the exemplary embodiment, the near field communication executed by the near field communication unit 22 is a non-contact communication in accordance with a NFC (near filed communication) standard. Thus, the MFP 10 can be communicably connected with the mobile terminal 100 having a near field communication unit 122 through the near field communication unit 22. According to the exemplary embodiment, the wireless communication executed by the wireless communication unit 23 is a Wi-Fi (registered trademark) in accordance with the standard of IEEE802 11b/g. The Wi-Fi connection is established between the MFP 10 and the mobile terminal 100 having the wireless communication unit 123, in an infrastructure mode, via an access point (not shown), which is a relaying device, and the wireless communication unit 23.

Typically, an example of the mobile terminal 100 is a smartphone or a cell phone. The mobile terminal 100 typically has a CPU 111, a flash memory 112, a RAM 113, operation keys 115, an LCD 116, a touch panel 117, a memory card interface (I/F) 118, an audio input unit 119, a telephone network communication unit 120, an acceleration sensor 121, a near field communication unit 122 and a wireless communication unit 12. The components 111-113 and 115-123 are interconnected through an input/output port 124. The CPU 111 controls components connected with a bus line 124, in accordance with fixed parameters and programs stored in the ROM 112 and the like.

The flash memory 112 is a rewritable non-volatile memory. In the flash memory, an operating system 112a (hereinafter, referred to as an OS 112a), an invoking application 112b, a function execution application 112c, and an application table 112d are stored. In the following description, the CPU which executes various programs of the applications or the programs or operating system will be referred to by the name of the application the CPU 11 executes. That is, for example, a description of "application" may means "the CPU 11 executing the application." The OS 112a is basic software realizing standard functions of the mobile terminal 100. According to an exemplary embodiment, the OS 112a is an Android® OS.

Figure 5A:
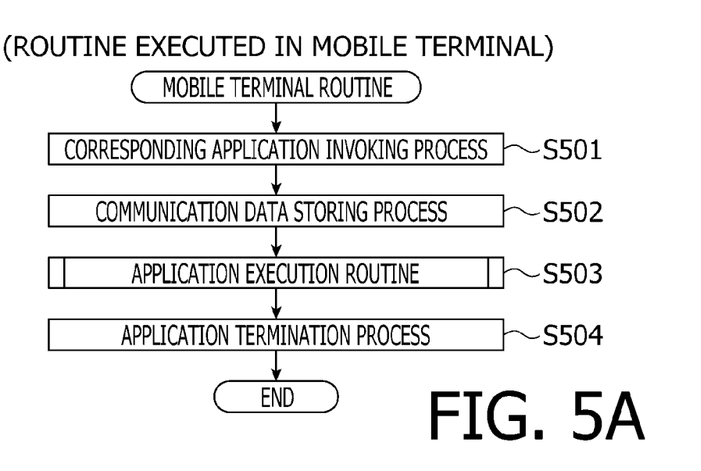
FIGS. 5A and 5B shows a main process and an application execution process, both executed in a smartphone.
Figure 5B:
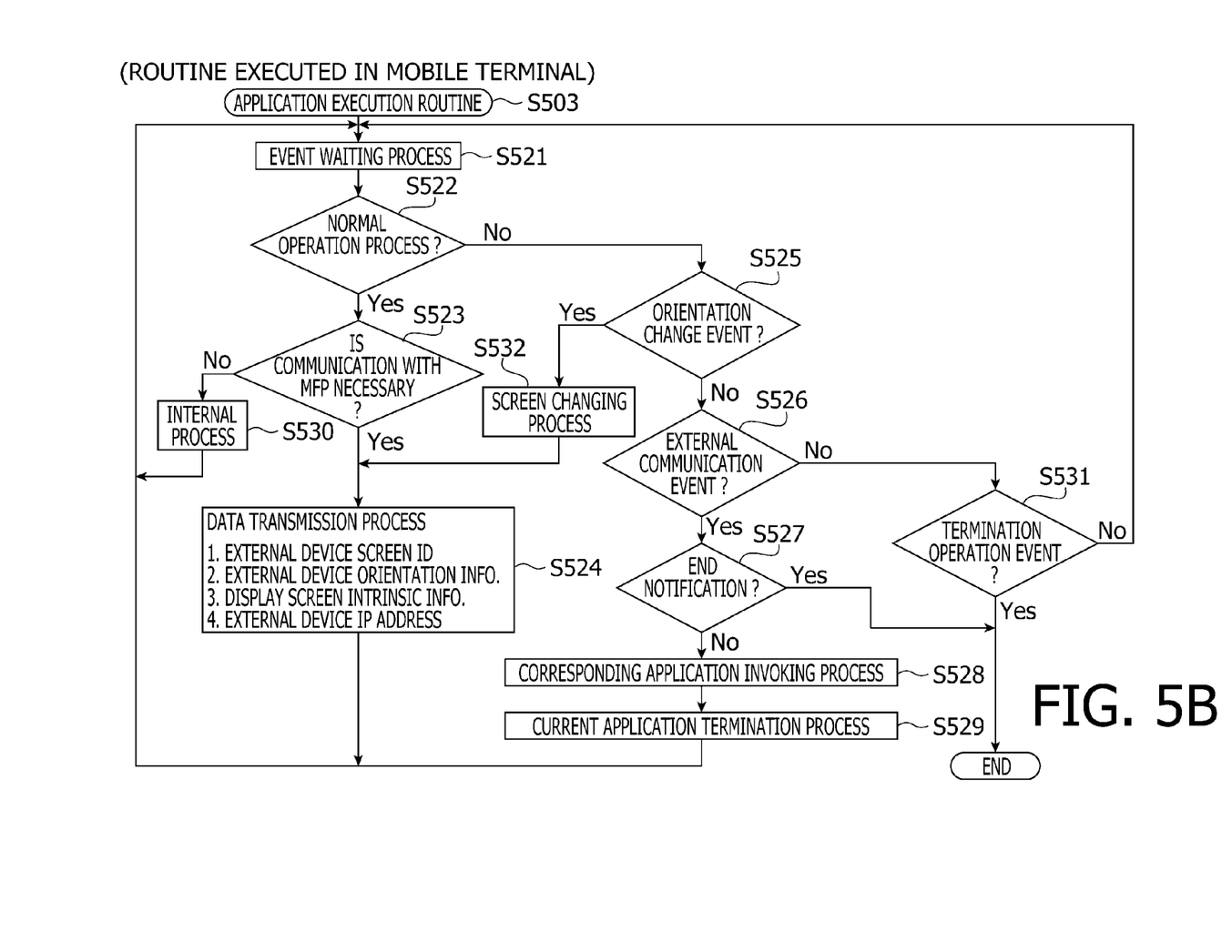

The invoking application 112b is a program which invokes an application corresponding a screen ID from among the function execution applications 112c when the screen ID and an application invoke command are received from the MFP 10. Steps in a process shown in FIG. 5A are executed by the CPU 11 when the invoking application 112b is executed. The function execution applications 112c are programs which control the functions of the MFP 10 from the mobile terminal 100. The invoking application 112b and the function execution applications 112c are provided, for example, by the manufacturer of the MFP 10. Steps of the process shown in FIG. 5B are executed by the CPU 11 in accordance with the function execution applications 112c. It is noted that the applications 112b, 112c are installed in the mobile terminal 100 by the user. The function execution application 112c are prepared such that different function execution applications 112c are prepared for different functions, respectively. Therefore, the number of the function execution applications 112c may be one or more than one.

The application table 112d is a table indicating relationship between the screen IDs which can be received from the MFP 10 and corresponding ones of the function execution applications 112c, respectively. When one function execution application 112c is installed, one of the screen IDs that can be received from the MFP 10 and corresponding to the installed function execution application 112c is stored in the application table 112d as the screen ID associated with the installed function execution application 112c. The application table 112d will be described in detail with reference to FIG. 1C.

The operation keys 115 are mechanical keys provided to the casing of the mobile terminal 100. The user can input values and commands through the operation keys 115. The LCD 116 are used to display various screens and information. The touch panel 117 is overlaid on the LCD 116 so that, when a designating member such as a finger or a stylus pen approaches or contacts the touch panel 117, a location (position) of the designating member is detected, which is input to the mobile terminal 100. The memory card I/F 118 are interface having a slot in which a well-known non-volatile memory card can be inserted therein and writing/reading of data is executed through the memory card I/F 118. The acceleration sensor 120 is, for example, a three-axis acceleration sensor capable of measuring each of the accelerations in three axes (i.e., X, Y and Z axes). Based on the accelerations in three axes measured by the acceleration sensor 120, the CPU 111 is capable of detecting an orientation (attitude) of the mobile terminal 100. The audio I/O unit 121 is an audio input/output device having a microphone and speaker. The telephone network communication unit 122 is a circuit used to communicate with an external device through the telephone network. The near field communication unit 122 is, similar to the near field communication unit 22 described above, an interface for the near field communication. The wireless communication unit 123 is, similar to the wireless communication unit 23 described above, an interface for the wireless communication.

As shown in FIG. 1B, which schematically shows the contents of the screen ID table 12b, the screen ID table 12b stores a screen ID 12b2 and a corresponding application 12b3 in association with a function 12b1. The function 12b1 represents information identifying a function (e.g. function A), among the functions the MFP 10 can execute, for which an application installable in the mobile terminal 100 as a function execution application 112c is available. According to the embodiment, as an example of such a function, one providing a text input function allowing the user to input a text and/or symbols will be described. The corresponding application 12b3 represents information identifying the function execution applications 112c for the functions 12b1, respectively. It should be noted that a plurality of applications 12b3 may be associated with a single function 12b1.

The screen ID 12b2 represent information identifying a screen displayed on the LCD 16. In the screen ID table 12b, for one of the functions 12b1, information identifying the screen to be displayed when the one of the functions 12b1 is executed is stored and the screen ID 12b2 in an associated manner. It is noted that one or a plurality of screen IDs 12*b*2 may be associated to one function 12*b*1. In the screen ID table 12*b* shown in FIG. 1B, a character string of the screen ID 12*b*2 (e.g., "A1(landscape)") indicates such that "A1" represents the screen ID, and a character string in parentheses (e.g., "landscape") means that the screen represented by the screen ID of "A1" is for the mobile terminal 100 in an landscape orientation. Further, a character string of the screen ID 12*b*2 (e.g., "A2(portrait)") indicates such that "A2" represents the screen ID, and a character string in parentheses (e.g., "portrait") means that the screen represented by the screen ID of "A2" is for the mobile terminal 100 in a portrait orientation.

According to the embodiment, the screen ID "A1(landscape)" represents a soft keyboard having a qwerty key arrangement, while the screen ID "A2(portrait)" represents a soft keyboard having a ten key arrangement. As above, the screen ID 12*b*2 (e.g., "A1(landscape)" and "A2(portrait)") stored in the screen ID table 12*b* includes not only information identifying a screen for the MFP 10 itself, but also the information regarding the orientation of the mobile terminal 100. In the following description, when the screen ID is described, the portion of the parentheses may be omitted for brevity. That is, the screen ID "A1(landscape)" and "A2(portrait)" may occasionally be referred to as the screen IDs "A1" and "A2", respectively. It is also noted that the screen ID 12*b*2 may be independent from the orientation of the mobile terminal 100.

As shown in FIG. 1C, which schematically shows the contents of the application table 112*d*, the application table 112*d* stores the corresponding applications 112*d*1 and the screen IDs 112*d*2 in an associated manner. The corresponding application 112*d*1 is information identifying one application (e.g., application A1, A2, . . . ) from among the function execution applications 112*c*. The screen ID 12*d*2 is the information identifying the screen to be displayed on the LCD 16 of the MFP 10. Therefore, in the application table 112*d* according to the embodiment, among the function execution applications 112*c*, ones corresponding to the screens displayed on the LCD 16 of the MFP 10 are stored in an associated manner. As will be described in detail, the mobile terminal 100 refers to the application table 112*d* when it receives the screen ID from the MFP 10, and invokes the function execution application 112*c* corresponding to the received screen ID. It is noted that the application table 112*d* may associate a plurality of screen IDs 112*d*2 with a single corresponding application 12*b*1.

Figure 2A:
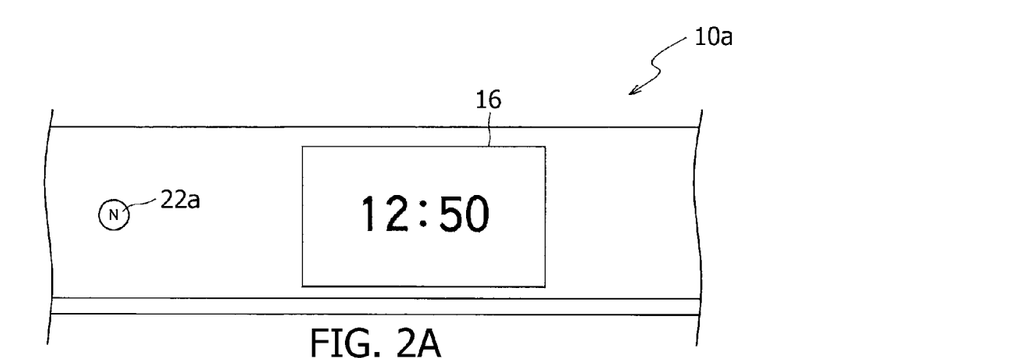
FIGS. 2A-2C schematically show an operation according to the embodiment of the invention.

As shown in FIG. 2A, on an operation panel 10*a* provided to the MFP 10, an LCD 16 and an antenna unit 22*a* for the near field communication unit 22 are provided. When an antenna unit of the near field communication unit 122 of the mobile terminal 100 is located closely to the antenna unit 22*a*, the near filed communication can be performed between the near field communication unit 22 of the MFP 10 and the near field communication unit 122 of the mobile terminal 100. According to the embodiment, the antenna unit of the near field communication unit 122 is provided on a rear surface of the mobile terminal 100, that is, on a surface opposite to the surface on which the LCD 116 is provided. Therefore, by placing the mobile terminal 100 with respect to the operation panel 10*a*, the antenna unit of the near filed communication unit 122 provide on the rear surface of the mobile terminal 100 can be located closely to the antenna unit 22*a* and the near field communication can be performed between the MFP 10 and the mobile terminal 100.

Figure 2B:
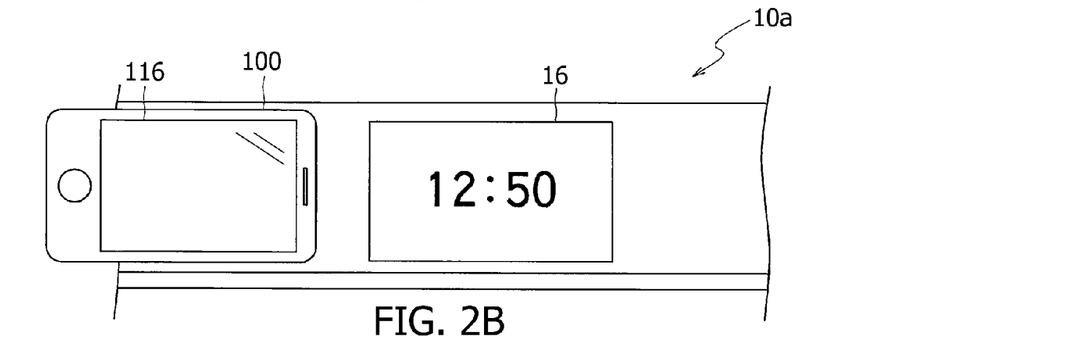

When the mobile terminal 100 is located at a position so that the near field communication can be performed between the MFP 10 and the mobile terminal 100, as shown in FIG. 2B, and the user has a screen corresponding to the user-intended function displayed on the LCD 16, if the screen corresponds to the screen ID 12*b*2 stored in the screen ID table 12*b*, that is, if the function execution application 112*c* corresponding to the screen is available, the MFP 10 transmits the screen ID corresponding to the screen currently displayed on the LCD 16, and an application invoking command corresponding to the currently executed function to the mobile terminal 100 by the near field communication via the near field communication unit 22.

For example, if the user displays a screen 201 of the soft keyboard having the qwerty key arrangement, which is one of the screens for text input screens stored in the screen ID table as the function 12*b*1, on the LCD 16 (see FIG. 2C), the MFP 10 transmits the screen ID corresponding to the displayed screen 201 (e.g., the screen ID of "A1") and an application invoking command to the mobile terminal 100 by the near field communication. When the mobile terminal 100 receives the screen ID "A1" and the application invoking command, the mobile terminal 100 invokes the function execution application 112*c* corresponding to the received screen ID.

Figure 2C:
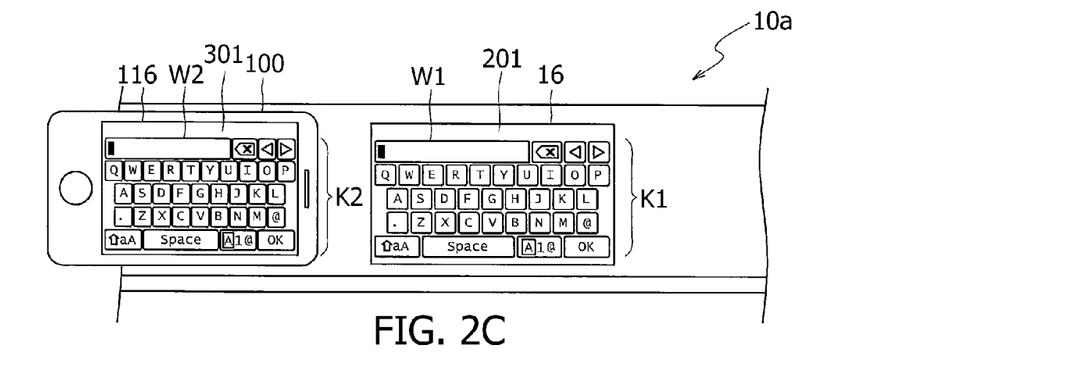

In the example shown in FIG. 2B, as the function execution application 112*c* (i.e., the application A1 in this exemplary embodiment), which corresponds to the screen 201 displayed on the LCD 16, is executed, a screen 301 of the soft keyboard having the qwerty key arrangement is displayed on the LCD 116 of the mobile terminal 100 as shown in FIG. 2C.

If the screen of the soft keyboard having a ten-key arrangement, which is another screen for the text input function, is displayed on the LCD 16, the MFP 10 transmits the screen ID of "A2" and the application invoking command to the mobile terminal 100 by the near field communication. As a result, in the mobile terminal 100, application A2 is invoked, and the keyboard having the ten-key key arrangement is displayed on the LCD 116.

As shown in FIG. 2C, the soft keyboards having the qwerty key arrangement and displayed on the screens 201 and 301 have the keys K1 and K2 for inputting the text, symbols and commands, and windows W1 and W2 for displaying the text and symbols input through the keys K1 and K2, respectively. The user can input the text and symbols in the MFP 10 from either the MFP 10 or the mobile terminal 100 by using the keyboard displayed on the screen 201 or 301.

When the MFP 10 is powered on, an MFP main routine shown in FIGS. 3A and 3B is executed. The MFP main routine is repeatedly executed while the MFP 10 is powered. In S301, the CPU 11 executes an event waiting process and waits for receipt of an event. When the CPU 11 receives a display switching event (S302: YES), which occurs when the displayed screen of the LCD 16 is switched by the user operation, the CPU 11 executes an screen switching process for switching the display screen of the LCD 16 in accordance with the received event (S303). It is noted that, in S303, the CPU 11 sets the communication with the mobile terminal 100 to be executed through the near field communication unit 22 in response to switching of the display screen. Next, the CPU 11 judges whether there is an application corresponding to the currently displayed screen (S304). Specifically, in S304, the CPU 11 refers to the screen ID table 12*b* and judges that an application corresponding to the currently displayed screen is available if there exists a screen ID 12*b*2 identifying the currently displayed screen, and there exists an application 12*b*4 which corresponds to the screen ID 12*b*2.

If the CPU 11 judges that an application corresponding to the currently displayed screen is not available (S304: NO), the CPU 11 returns control to S301. If the CPU 11 judges that an application corresponding to the currently displayed screen is available (304: YES), the CPU 11 executes a process to notify that there is information to be transmitted by the near filed communication (S305). Specifically, in S305, the CPU 11 causes a superficial part of the antenna unit 22a on the operation panel 10a to emit light with an LED (light emitting diode) or the like, for example. Alternatively, the CPU 11 may display a notification message on the LCD 16, or outputs an audio guidance from a speaker. By such a notification, it is possible to make the user pay attention, and set the mobile terminal 100 at a position (e.g., as shown in FIG. 2B) where the near field communication can be executed.

In S306, the CPU 11 judges whether the near field communication can be executed with the mobile terminal 100. If the near field communication cannot be executed with the mobile terminal 100 (S306: NO), the CPU 11 returns control to S301. Specifically, the CPU 11 judges that the near field communication with the mobile terminal 100 cannot be executed if the mobile terminal 100 is not located at a position where the near field communication can be executed within a predetermined period (e.g., ten seconds) after the notification based on S305 is started. If the CPU 11 judges that the near field communication can be executed (S306: YES), the CPU 11 executes an NFC transmission process (S307), and returns control to S301. Specifically, in the NFC transmission process (S307), the CPU 11 transmits an application invoking command, the screen ID identifying the currently displayed screen, and an MFP IP address identifying the MFP 10 to the mobile terminal 100. When the above data is received, the mobile terminal 100 invokes the function execution application 112c corresponding to the received screen ID. Further, the mobile terminal 100 executes a wireless communication with the MFP 10 using the MFP IP address as received. It is noted that the CPU 111 sets a communication method with the mobile terminal 100 to the wireless communication through the wireless communication unit 23 in response to transmission of the MFP IP address to the mobile terminal 100.

If the CPU 11 receives a close external device event (S302: NO; S308: YES) as the mobile terminal 100 is located to the position where the near field communication can be executed, the CPU 11 judges whether there exists an application corresponding to the currently display screen (S309). If the CPU 11 judges that there is not an application corresponding to the currently displayed screen (S309: NO), the CPU 11 returns control to S301. If the CPU 11 judges that there is an application corresponding to the display screen (S309: YES), the CPU 11 proceeds control to S307 and executes the NFC transmission process.

If the CPU 11 receives a data receipt event as data is received from the mobile terminal 100 by the wireless communication through the wireless communication unit 23 (S308: NO; S310: YES) the CPU 11 executes data analyzing process of analyzing data received from the mobile terminal 100 (S311). Specifically, in the received data analyzing process (S311), the CPU 11 analyzes the data received from the mobile terminal 100 and extracts therefrom an external device screen ID which is information identifying a screen displayed on the LCD 116 of the mobile terminal 200, external device orientation information identifying an orientation of the mobile terminal 100, display screen intrinsic information identifying an input value which is input through the screen displayed on the LCD 116 of the mobile terminal 100, and an external device IP address identifying the mobile terminal 100.

The CPU 11 judges whether the external device screen ID extracted in S311 and the screen ID corresponding to the currently displayed screen are identical (S312). The screen identified by the external device screen ID depends on the function execution application 112c that caused the screen to be displayed. Therefore, if the external device screen ID is the ID corresponding to the screen to be displayed by the function execution application 112c that has been invoked based on the screen ID corresponding to the currently displayed screen, the CPU 11 judges that the extracted external device screen ID is identical to the screen ID corresponding to the currently displayed screen. It is noted that if the displayed screen on the LCD 16 has been switched in accordance with the orientation of the mobile terminal 100 in a screen display control process (see FIG. 4), the screen before switched is treated as the currently displayed screen.

If the CPU 11 judges that the external device screen ID and the screen ID corresponding to the currently displayed screen are identical (S312: YES), the CPU 11 executes the screen display control process (S313) which controls the display screen on the LCD 16 based on the data received from the mobile terminal 100, and return control to S301. The screen display control process (S313) will be described in detail later, referring to FIG. 4. Thus, when the currently displayed screen is the keyboard having the qwerty key arrangement and if the external device screen ID having the same value as the screen ID of the keyboard having the qwerty key arrangement (i.e., "A1") is received, the CPU 11 executes the screen display control process (S313). For another example, if the currently displayed screen is the keyboard having the ten key arrangement, the if the external device screen ID having the same value as the keyboard having the ten key arrangement (i.e., "A2") is received, the CPU 11 executes the screen display control process (S313).

If the external device screen ID extracted from the data received from the mobile terminal 100 is different from the screen ID corresponding to the currently displayed screen (S312: NO), the CPU 11 judges whether there exists a function execution application 112c corresponding to the currently displayed screen (S314) as is done in S304. If the CPU 11 judges that there exists a function execution application 112c corresponding to the currently displayed screen (S314: YES), the CPU 11 executes a screen ID notifying process (S315), and returns control to S301. Therefore, for example, if the currently displayed screen is the screen of the keyboard having the qwerty key arrangement, and the CPU 11 receives the external device screen ID having the value same as the screen of the keyboard having the ten key arrangement (i.e., "A2"), and further if there exists function execution application 112c which corresponds to the screen ID corresponding to the currently displayed screen, the CPU 11 executes the screen ID notifying process (S315).

Specifically, in the screen ID notifying process (S315), the CPU 11 transmits the screen ID corresponding to the currently displayed screen to a destination which has the external device IP address extracted from the data received from the mobile terminal 100 as a destination address, by the wireless communication through the wireless communication unit 23. The mobile terminal 100 receives the screen ID transmitted by the screen ID notifying process (S315) through the wireless communication unit 123, terminates the currently executed function execution application 112c, and invokes the function execution application 112c corresponding to the received screen ID. Therefore, an application corresponding to the screen displayed on the LCD 16 can be invoked in the mobile terminal 100.

If the CPU 11 judges that an application corresponding to the currently displayed screen does not exist (S314: NO), the CPU 11 executes an end notifying process (S316), and returns control to S301. Specifically, in the end notifying process (S316), the CPU 11 transmits a notification (end notification)

to terminate the function execution application 112c currently being executed in the mobile terminal 100 by the wireless communication to a destination having the external device IP address as extracted through the wireless communication unit 23. The mobile terminal 100 terminates the currently executed function execution application 112c if the end notification is transmitted by the end notifying process (S316) through the wireless communication unit 123.

As shown in FIG. 4, when the screen display control process starts, if the CPU 11 judges that the screen currently displayed on the LCD 16 is the soft keyboard (i.e., whether the currently executed function is a text input function) (S401: YES), the CPU 11 judges whether the orientation of the mobile terminal 100 is a landscape or a portrait based on the external device orientation information extracted from the data received from the mobile terminal 100 (S402). If the CPU 11 judges that the orientation of the mobile terminal 100 is the landscape (S402: YES), the CPU 11 executes a window expansion process (S403). Thus, if the currently displayed screen on the LCD 16 of the MFP 10 and the screen displayed on the LCD 116 of the mobile terminal 100 are both the soft keyboards having the qwerty key arrangement, the CPU 11 executes the window expansion process. Specifically, in the window expansion process (S403), the CPU 11 deletes the keys K1 and expand the window W1 to meet the size of the LCD 16. In this case, since the soft keyboard having the qwerty key arrangement is displayed on the LCD 116 of the mobile terminal 100, even if the keys K1 are deleted from the LCD 16 of the MFP 10, the user can input texts/symbols in the MFP 10 by operation the keys K2 of the soft keyboard having the qwerty key arrangement and displayed on the LCD 116 of the mobile terminal 100. Therefore, by deleting the keys K1 displayed on the LCD 16 of the MFP 10 and by expanding the window W1 instead, input of the texts/symbols and check of the same can be made easy. It is noted that, as a result of the window expansion process (S403), the screen ID of the screen in which the keys K1 are deleted from the soft keyboard having the qwerty key arrangement and the window W1 is expanded is the same as the screen ID of the screen displaying the soft keyboard having the qwerty key arrangement.

Next, the CPU 11 executes an input value reflecting process (S404) in which input values identified by the display screen intrinsic information extracted from the data received from the mobile terminal 100 are reflected. Then, the current process is terminated. An example of the process in S404 is a process in which an input through the soft keyboard displayed on the LCD 116 of the mobile terminal 100, when the text input function is being executed (i.e., when the soft keyboard is displayed on the LCD 16), is reflected on the LCD 16 as the input through the soft keyboard being displayed on the LCD 16.

If the CPU 11 judges that the orientation of the mobile terminal 100 is not landscape (S402: NO), the CPU 11 judges whether the keys of the soft keyboard being displayed on the LCD 16 are the ten keys (S405). If the keys currently displayed are not the ten keys (S405: NO), the CPU 11 moves control to S404.

If the currently displayed keys are the ten keys (S405: YES), the CPU 11 executes a key arrangement switching process (S406) to switch the key arrangement from the ten key arrangement to the qwerty key arrangement. Then, the CPU 11 moves control to S404. Therefore, if both the screen currently displayed on the LCD 16 of the MFP 10 and the screen displayed on the LCD 116 of the mobile terminal 100 are the soft keyboards having the ten key arrangement, the CPU 11 executes the key arrangement switching process. In such a case, the user can perform an input operation using both the soft keyboard having the qwerty key arrangement and displayed on the LCD 16 of the MFP 10 and the soft keyboard having the ten key arrangement and displayed on the LCD 116 of the mobile terminal 100, the input operation can be performed conveniently. It is noted that, switching of the screen on the LCD 16 as a result of the process in S406 is executed is not the switching of the screen by the user operation, the screen switching event does not occur. Further, in such a case, the screen ID before the screen is switched (e.g., the screen ID of "A2") is kept used as the screen ID after the switching (i.e., the screen ID of the keyboard having the qwerty key arrangement).

In S406, if it is judged that the screen currently displayed on the LCD 16 is not the soft keyboard (S401: NO), the CPU 11 moves control to S404, and executes a process to reflect the input value identified by the display screen intrinsic information based on the currently executed function. As described above, according to the screen display control process (S313), it is possible to cause the screen corresponding to the orientation of the mobile terminal 100 to be displayed.

A mobile terminal routine shown in FIG. 5A is invoked every time when the OS 112a detects an event which occurs in response to data receipt by the near field communication unit 122. The CPU 111 firstly invokes the function execution application 112c corresponding to the screen ID contained in the received data (S501). Specifically, in S501, the CPU 111 refers to the application table 112d and invokes the function execution application 112c identified by the corresponding application 112d1 which corresponds to the received screen ID 112d2. For example, when the application table 112d shown in FIG. 1C is used, if the received screen ID is "A1", which represents the soft keyboard having the qwerty key arrangement, the CPU 111 invokes the application A1 which is one of the function execution applications 112c. If the received screen ID is "A2", which represents the soft keyboard having the ten key arrangement, the CPU 111 invokes the application A2 which is one of the function execution applications 112c.

Next, the CPU 111 executes a process to store the received data (S502). As the process in S502 is executed, for example, the IP address of the MPF 10 contained in the received data is stored in the RAM 113. The CPU 111 executes an application execution process (S503) to follow the process of the function execution application 112c which is invoked in S501. The application execution process will be described in detail with reference to FIG. 5B. The CPU 111 then executes, in S504, a process to terminate the function execution application 112c which was invoked in S501, and terminates the mobile terminal main routine shown in FIG. 5A.

In the application execution process (FIG. 5B), the CPU 111 firstly executes an event waiting process (S521) to wait for receiving an event. When a normal operation event, which is an event occurred when the user performs an operation with the function execution application 112c, is received, and if the CPU 111 judges that the normal operation event requires the communication with the MFP 10 (S522: YES; S523: YES), the CPU 111 executes a data transmission process (S524). It is noted that an example of the event requiring the communication with the MFP 10 is an event which occurs when an enter key of the soft keyboard is operated when the currently executed function execution application 112c is an application that realizes a text input function.

In the data transmission process (S524), the CPU 111 transmits:

an external device screen ID which is information identifying the screen displayed on the LCD 116 of the mobile terminal 100 in accordance with the currently executed function execution application;

external device orientation information which is information identifying the orientation of the mobile terminal 100 represented by the acceleration sensor;

display screen intrinsic information identifying input value through the screen currently displayed on the LCD 116; and an external device IP address representing the destination address of the wireless transmission/reception unit 123 of the mobile terminal 100, by the wireless communication through the wireless communication unit 123, with the destination address being the IP address of the MFP 10 stored in the RAM 113 in S502. Regarding the external device IP address, the process may be modified such that the external device IP address is transmitted once, and transmission thereof may be prohibited thereafter. The data received by the data transmission process (S524) is received by the MFP 10, via the wireless communication unit 23, and the MFP 10 executes control corresponding to the information contained in the received data.

The CPU 111 returns control to S521 after execution of the data transmission process (S524). If the received normal operation event is not the event requiring the communication with the MFP 10 (S523: NO), for example, the normal operation event which is received based on text input with the soft keyboard, the CPU 111 executes an inner process based on the received normal operation event (S530) and returns control to S521.

If the CPU 11 receives an orientation change event based on change of value of the acceleration sensor 120 (S522: NO; S525: YES), the CPU 111 executes a screen change process (S532) to change the screen displayed on the LCD 116 in accordance with the change of orientation of the mobile terminal 100. Then, the CPU 111 moves control to S524, and transmits the external device screen ID, external device orientation information indicative of the orientation of the mobile terminal 100 which is represented by the value of the acceleration sensor 120, display screen intrinsic information and the external device IP address to the MFP 10 by the wireless communication. If the function execution application 112c is configured not to change the screen displayed on the LCD 116 depending on the orientation of the mobile terminal 100, the CPU 11 skips S532 and executes S524. The MFP 10 control the screen displayed on the LCD 16 based on the data transmitted in the data transmission process (S524).

If the CPU 111 receives the external communication event based on a fact that the data is received from the MFP through the wireless communication unit 123 (S525: NO; S526: YES), the CPU 111 judges whether the data received from the MFP 10 is the end notification (S527). If the data received from the MFP 10 is the end notification (S527: YES), the CPU 111 terminates the application execution routine. As the application execution routine is terminated, the CPU 111 executes S504 of FIG. 5B, thereby function execution application 112c currently executed is terminated.

If the CPU 111 judges that the data received from the MFP 10 is not the end notification (S527: NO), the received data is the screen ID transmitted in the screen ID notification process (S315) in FIGS. 3A and 3B. In this case, similar to S501, the CPU 111 invokes the function execution application 112c (S528) with reference to the application table 112d. Next, the CPU 111 terminates the currently executed function execution application 112c (S529), and moves control to S521.

If the CPU 111 receives the termination operation event based on the user operation of the mobile terminal 100 (S526: NO; S531: YES), the CPU 111 terminates the current routine. As the current routine is terminated, the CPU 111 executes S504 of FIG. 5B, thereby the function execution application 112c currently executed is terminated. If the termination event is not received (S531: NO), the CPU 111 moves control to S521.

According to the exemplary embodiment, the MFP 10 transmits the screen ID displayed on the LCD 16, that is the screen ID corresponding to the function the MFP 10 can execute, and the application invoke command to the mobile terminal 100. Then, in the mobile terminal 100, the function execution application 112c corresponding to the function the MFP 10 is executing can be invoked.

Since the screen displayed on the LCD 16 of the MFP 10 is changed by the user operation, the screen ID corresponding to the switched screen is transmitted to the mobile terminal 100. Therefore, in the mobile terminal 100, the function execution application 112c appropriately corresponding to change in the MFP 10 can be invoked. Further, the mobile terminal 100 in which the function execution application 112c is invoked is capable of controlling the screen of the MFP 10 by transmitting data generated by the function execution application 112c to the MFP 10. Therefore, the function corresponding to the screen of the MFP 10 can be executed from the mobile terminal 100 easily.

In particular, since the MFP 10 transmits the screen ID to the mobile terminal 100 by the near field communication, even if the mobile terminal 100 is in a standby state (i.e., a sleeping state), the mobile terminal 100 can detect receipt of the data. Therefore, it is not necessary to keep the mobile terminal 100 in a active state all the time, and consumption of electrical power of the mobile terminal 100 can be saved. In contrast, the data generated by the function execution application 112c is transmitted by the wireless communication. Therefore, even if the data size is relatively large, the MFP 10 can receive such data from the mobile terminal 100 at a high speed. Therefore, it is possible to prevent a problem that delay in displaying a screen in the MFP 10 corresponding to the data received from the mobile terminal 100 with respect to a timing at which the data is transmitted from the mobile terminal 100 to the MFP 10.

The mobile terminal 100 is an example of an information processing device. The near field communication unit 22 is an example of a first type interface. The wireless communication unit 23 is an example of a communication unit and a second type interface. The LCD 16 is an example of the display unit. The flash memory 12 is an example of the storage unit. The CPU 11 is an example of a control unit. The screen ID is an example of identifying information. The application invoke command is an example of an application invoke command. The IP address of the MFP is an example of an establishing information. The external device screen ID, the display screen intrinsic information are example of application information. The external device orientation information is example of orientation information. The screen 201 is an example of a screen capable of acquiring input of text and/or symbols. The keys K1 is examples of keys.

The present invention has been described based on the exemplary embodiment. It is noted that the invention should not be limited to the configuration of the above-described exemplary embodiment, and it should be understood that the configuration can be modified in various ways without departing the gist of the invention.

For example, the MFP 10 is described as the function execution device. It is noted that any device which has one or more functions can serve as an example of the function execution device according to the aspects of the present invention. For example, a scanner device or a printer device can serve as the function execution device according to aspects of the invention. Further, in the above-described exemplary embodiment, the mobile terminal 100 such as the smartphone or cell phone is described as an example of the information processing device. Alternatively, a tablet terminal or a digital camera can be an example of the information processing device. Further, the information processing terminal does not need to be a mobile device, and any device which can perform the near field communication with the function execution device can be an example of the information processing device. Further, according to the exemplary embodiment, the OS 12a is an OS of Android (registered trademark), but another OS may be employed.

In the above-described exemplary embodiment, one of the functions stored as a function 12b1 in the screen ID table 12b, the text input function is described as an example, and the screen corresponding to the text input function is controlled by the mobile terminal 100. It should be noted that the present invention can be applied to a screen corresponding to register a shortcut (i.e., a shortcut registration function), a screen corresponding to input a speech (i.e., a speech input function), and a screen displaying a preview of an image (i.e., a preview displaying function).

In the above-described exemplary embodiment, one function execution application 112c is executed in the mobile terminal 100 for one function. This configuration can be modified such that, to one function, more than one function execution applications 112c may correspond, and part of the function execution applications 112c corresponding to a plurality of screen IDs which corresponding to one function may be executed.

In the exemplary embodiment, the mobile terminal 100 is configured to execute the application execution process (S503) every time the event is received. This configuration may be modified such that the process is periodically at a predetermined interval (e.g., at every 0.5 or 1 second).

In the above-described exemplary embodiment, the external device information represents the information indicating the orientation of the mobile terminal 100 indicated by the acceleration sensor 120. The external device orientation information may be information identifying orientation of the mobile terminal 100 with respect to the MFP 10, regardless of the absolute orientation of the mobile terminal 100.

The external device orientation information need not be limited to information based on the detected value by the acceleration sensor 120. The external device orientation information may be information based on detection values by another sensor, such as a gyro sensor or GPS (global positioning system) sensor.

According to the exemplary embodiment, the wireless communication between the MFP 10 and the mobile terminal 100 is established as the MFP 10 transmits the IP address of the MFP 10 to the mobile terminal 100 by the near field communication. It is noted that the information used to establish the wireless communication may be a MAC address, or a request for establishment of the wireless communication may be transmitted from the MFP 10 to the mobile terminal 100.

In the exemplary embodiment, the screen ID of the currently displayed screen on the LCD 16 is transmitted to the mobile terminal 100 (S315 of FIG. 3B). This can be modified such that the external device orientation information received from the mobile terminal 100, that is, the screen ID corresponding to the orientation of the mobile terminal 100 may be transmitted to the mobile terminal 100. According to such a modification, for example, when the external device orientation information received during execution of function "A" represents that the orientation of the mobile terminal 100 is the portrait, the ID "A2" which is stored in the screen ID table 12b as the screen ID 12b2 is transmitted to the mobile terminal 100, the application A2 corresponding to the orientation of the mobile terminal 100 is invoked in the mobile terminal 100. Therefore, when the orientation of the mobile terminal 100 is changed, the function execution application 112c corresponding to the changed orientation can be invoked.

In another modification, the MFP 10 stores the screen ID when the user switched the screen (i.e., when the function is switched), and if the orientation of the mobile terminal 100 corresponding to the screen ID is different from the orientation of the mobile terminal 100 represented by the received external device orientation information, the stored screen ID is transmitted to the mobile terminal 100. According to such a modification, if the mobile terminal 100 is configured to invoke the function execution application 112c corresponding to the orientation thereof, even if the user inadvertently changes the orientation of the mobile terminal 100, the function execution application 112c corresponding to the original function in the MFP 10 can be re-invoked.

In the exemplary embodiment, it is judged in S312 (FIG. 3A) whether the external device screen ID is equal to the screen ID. Instead of the external device screen ID, using information identifiable the function application 112c corresponding to the screen currently displayed on the LCD 116 of the mobile terminal 100 (e.g., an application ID), the comparison with the screen ID can be performed. Specifically, in S312, the application ID received from the mobile terminal 100 and the application ID corresponding to the screen ID may be compared. In this case, if the application ID received from the mobile terminal 100 and the application ID corresponding to the screen ID are the same, S313 may be executed, otherwise, S315 is executed. According to such a modification, even if the user invokes a wrong function execution application 112c in the mobile terminal 100, the function execution application 112c corresponding to the currently executed function in the MFP can be invoked in the mobile terminal 100.

According to the exemplary embodiment, when the currently displayed screen on the LCD 16 of the MFP 10 and the currently displayed screen on the LCD 116 of the mobile terminal 100 are screens of the soft keyboard having the qwerty key arrangement, the keys displayed on the LCD 16 of the MFP 10 are extinguished, and the window is expanded to meet the size of the LCD 16. Similarly, when the currently displayed screen on the LCD 16 of the MFP 10 and the currently displayed screen on the LCD 116 of the mobile terminal 100 are screens of the soft keyboard having the ten key arrangement, the keys displayed on the LCD 16 of the MFP 10 may be extinguished, and the window may be expanded to meet the size of the LCD 16.

In the exemplary embodiment, if both the currently displayed screen on the LCD 16 of the MFP 10 and the currently displayed screen on the LCD 116 of the mobile terminal 100 are screens of the soft keyboard having the ten key arrangement, the key arrangement of the soft keyboard displayed on the LCD 16 of the MFP 10 is changed to one having the qwerty key arrangement. Similarly, if both the currently displayed screen on the LCD 16 of the MFP 10 and the currently displayed screen on the LCD 116 of the mobile terminal 100 are screens of the soft keyboard having the qwerty key arrangement, the key arrangement of the soft keyboard displayed on the LCD 16 of the MFP 10 may be changed to one having the ten key arrangement.

What is claimed is:

1. A function execution device capable of executing one or more functions, comprising:
   a communication device configured to communicate with an information processing device;
   a displaying device configured to display screens, wherein each screen corresponds to one of the one or more functions;
   a receiving device configured to receive a user instruction;
   a storing device configured to store:
      one or more pieces of identifying information identifying the screens, respectively; and
      relationship information identifying a relationship among the one or more functions, the one or more pieces of identifying information, and one or more applications executed in the information processing device, each of the one or more applications being configured to control a corresponding one of the one or more functions; and
   a controller,
   wherein, when the receiving device receives the user instruction to switch a screen displayed on the displaying device to a switched screen of the screens, the controller is configured to:
      determine one of the one or more pieces of identifying information identifying the switched screen; and
      determine, based on the one or more pieces of identifying information and the relationship information, whether there exists an application related to the switched screen;
   wherein, in response to a determination that there exists the application related to the switched screen, the controller executes instructions to provide, via a transmitting unit:
      one of the one or more pieces of identifying information identifying the switched screen and an invoking command to invoke the application corresponding to the switched screen to the information processing device through the communication device.

2. The function execution device according to claim 1, wherein the instructions further cause the controller to:
   receive application information which is output by the application corresponding to the identifying information transmitted by the transmitting unit, through the communication device; and
   control the screen to be displayed on the displaying device in accordance with the application information received by the receiving unit.

3. The function execution device according to claim 2, wherein the communication device includes:
   a first type interface; and
   a second type interface of which a communication speed is faster than that of the first type interface,
   wherein the controller transmits, through the first type interface, the identifying information, the invoking command and establishing information for establishing a communication through the second type interface, to the information processing device, wherein the controller is further configured to change an interface to be used for communicate with the information processing device from the first type interface to the second type interface in response to transmission of the establishing information.

4. The function execution device according to claim 3, wherein the controller receives the application information from the information processing device through the second type interface if the controller has changed the interface to be used for communicating with the information processing device to the second type interface.

5. The function execution device according to claim 3, wherein the controller is further configured to:
   switch a screen displayed on the displaying device from a first screen to a second screen;
   change the interface to be used for communicating with the information processing device from the second type interface to the first type interface if the screen displayed on the displaying device is changed to the second screen after the interface has changed from the first type interface to the second type interface; and
   transmit, through the first type interface, the identifying information identifying the second screen, the invoking command and the establishing information to the information processing device when the interface to be used for communicating with the information processing device has changed to the first type interface.

6. The function execution device according to claim 2, wherein:
   the identifying information stored in the storing device includes first identifying information and second identifying information;
   the controller is further configured to receive the orientation information of the information processing device from the information processing device and
   transmit one of the first identifying information and the second identifying information as the identifying information to the information processing device based on the orientation information.

7. The function execution device according to claim 2, wherein:
   the controller transmits the identifying information that identifies the screen currently displayed on the displaying device of the function execution device, the application information includes information identifying the application if the identifying information identifying the application, which information contained in the application information is different from the information output by an application corresponding to the identifying information that identifies the screen currently displayed on the displaying device of the function execution device.

8. The function execution device according to claim 2, wherein:
   if the screen displayed on the displaying device is a screen capable of acquiring user input of the text or symbols, and is a screen displaying a key for acquiring the user input, the controller transmits the identifying information corresponding to the application capable of acquiring the user input of the text or the symbols; and
   if the controller receives the application information output by the application capable of acquiring user input of text or symbols in response to transmission of the identifying information corresponding to the application, the controller extinguishes the key displayed on the displaying device, while, if the controller does not receive the application information output by the application, the controller does not extinguish the key displayed on the displaying device.

9. The function execution device according to claim 2, wherein:
   if the screen displayed on the displaying device is a screen displaying the text or symbols, a screen displaying a key for acquiring the user input, and a screen displaying an input field that displays the user input acquired through the key, the controller transmits the identifying information to the information processing device; and if the controller receives the application information output by the application in response to transmission of the identifying information corresponding to the application, the controller expands the input field currently displayed.

10. The function execution device according to claim 2, wherein:
if the screen displayed on the displaying device is a screen capable of acquiring user input of the text, symbols or numerals, and is a first screen displaying a key for acquiring the user input, the controller transmits the identifying information corresponding to the application capable of acquiring the user input of the text or the symbols; and
if the controller receives the application information output by the application capable of acquiring user input of text, symbols or numerals in response to transmission of the identifying information corresponding to the application, the controller displays a second screen capable of acquiring user input of text, symbols or numerals and configured to display a key used to acquire the text, symbols or numerals, the second screen being different from the first screen.

11. The function execution device according to claim 2, wherein:
the identifying information stored in the storing device includes first identifying information and second identifying information;
wherein the controller is further configured to receive the orientation information of the information processing device from the information processing device and display a screen representing one of the first identifying information and the second identifying information based on the orientation information.

12. The function execution device according to claim 1, wherein the controller transmits the identifying information that identifies the screen displayed on the displaying device and an invoking command that invokes the application at every switching of the screen displayed on the displaying device.

13. The function execution device according to claim 1, wherein the controller further is configured to notify that a communication with the information processing device can be executed if there is identifying information which can be transmitted to the information processing device by the controller.

14. A system comprising:
a functional peripheral; and
a smartphone:
wherein the functional peripheral further comprises:
a first interface;
a second interface of which a communication speed is faster than that of the first interface;
a first memory storing a first table, the first table containing a correspondence of a function and a screen ID, the screen ID being for identifying a screen displayed currently on the first display while the function is executed;
a first display;
a first processor coupled to the first interface, the second interface, the first memory and the first display;
wherein the smartphone further comprises;
a third interface that is communicable with the first interface;
a fourth interface of which a communication speed is faster than that of the third interface, the fourth interface being communicable with the second interface;
a second memory storing a second table, the second table containing the screen ID in association with a particular application;
a second display; and
a second processor;
wherein the first processor is configured to:
determine whether a first communication between the functional peripheral and the smartphone through the first interface and the third interface has been established;
when the first communication has been established, transmit the screen ID and invoking command to the smartphone through the first interface;
wherein the second processor is configured to:
receive the identifying information and the invoking command transmitted from the functional peripheral;
determine the particular application that is identified by the received screen ID by referring to the second table stored in the second memory;
invoke the particular application in accordance with the received invoking command; and
control the second display to display a screen corresponding to the received screen ID.

15. The system according to claim 14,
wherein the first processor is configured to:
transmit a first IP address to the smartphone through the first interface, the first IP address being assigned to the functional peripheral;
establish a second communication between the functional peripheral and the smartphone, by using the first IP address, through the second interface and the fourth interface,
wherein the second processor is configured to:
receive the first IP address transmitted from the functional peripheral; and
store the received first IP address in the second memory.

16. The system according to claim 15,
wherein the second processor is configured to:
determine whether a particular event occurs in the smartphone;
transmit particular data corresponding to the particular application, the particular data including the screen ID and intrinsic information, the screen ID corresponding to the screen displayed currently on the second display, the intrinsic information being for identifying an input through the screen displayed currently on the second display;
wherein the first processor is configured to:
receive the screen ID and the intrinsic information transmitted from the functional peripheral;
control the first display to display a screen corresponding to the received screen ID, the screen being generated based on the received intrinsic information.

17. The function execution device according to claim 1,
wherein the invoking command is configured to cause the information processing device to display, on the display screen of the information processing device, a screen that is the same as the screen being displayed on the displaying device of the function execution device.

18. A function execution device comprising:
a first interface;
a second interface of which a communication speed is faster than that of the first interface;

a first memory storing a first table, the first table containing a correspondence of a first function and a first screen ID, the first screen ID being for identifying a first screen displayed currently on the first display while the first function is executed;

a first display;

a first processor, coupled to the first interface, the first memory and the first display;

wherein the first processor is configured to:
- determine whether a first communication between the function execution device and an information processing device through the first interface has been established;
- when the first communication has been established, transmit the first screen ID, a first invoking command and a first establishing information to the information processing device through the first interface,
- wherein the first invoking command causes the information processing device to invoke a first particular application identified by the first screen ID, and the first establishing information is used for establishing a second communication through the second interface with the information processing device;
- establish the second communication through the second interface with the information processing device by using the first establishing information;
- receive first application information outputted by the first particular application in the information processing device through the second interface; and
- control the first display to display information corresponding to the received first application information.

19. The function execution device according to claim 18, wherein the first processor is further configured to:
- control the first display to display a second screen while the second communication is established between the function execution device and the information processing device, the second screen being different from the first screen, a second screen ID being contained in the first table and corresponding to the second screen and a second particular application;
- revoke the second communication and establish the first communication between the function execution device and the information processing device; and
- transmit the second screen ID and a second invoking command to the information processing device through the first interface,
- wherein the second invoking command causes the information processing device to invoke the second particular application identified by the second screen ID.

20. The function execution device according to claim 18, wherein the first screen ID includes one of a first orientation ID and a second orientation ID,
wherein the first processor is further configured to:
- receive orientation information from the information processing device through the first interface, the orientation information indicating an orientation of the information processing device;
- specify one of the first orientation ID and the second orientation ID, the specified one being complied with the received orientation information; and
- transmit the specified one of the first orientation ID and the second orientation ID along with the first screen ID and the first invoking command to the information processing device through the first interface.

21. The function execution device according to claim 18, wherein processor is configured to:
- control the first display to display the first screen including keys, wherein a user's input of characters is inputted through the displayed keys;
- determine whether the received first application information indicates that the first particular application has a capability of acquiring the user's input of characters through a user interface of the first particular application; and
- when determined that the received first application information indicates that the first particular application has the capability, remove the keys from the first screen.

* * * * *